United States Patent
Susca et al.

(10) Patent No.: US 12,428,996 B1
(45) Date of Patent: Sep. 30, 2025

(54) COMPACT SINGLE VARIABLE DISPLACEMENT PUMP FUEL SYSTEM WITH HIGH PRESSURE FUEL OIL COOLER BYPASS AND GAS GENERATOR FAULT

(71) Applicant: Hamilton Sundstrand Corporation

(72) Inventors: Ryan Susca, Windsor, CT (US); Ryan Shook, Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/620,134

(22) Filed: Mar. 28, 2024

(51) Int. Cl.
| F02C 7/236 | (2006.01) |
| F02C 7/22 | (2006.01) |
| F02C 7/232 | (2006.01) |
| F02C 9/30 | (2006.01) |

(52) U.S. Cl.
CPC ............... *F02C 7/232* (2013.01); *F02C 7/22* (2013.01); *F02C 7/236* (2013.01); *F02C 9/30* (2013.01)

(58) Field of Classification Search
CPC .. F02C 7/236; F02C 7/22; F02C 7/232; F02C 9/30; F02C 7/224
See application file for complete search history.

(56) References Cited

U.S. PATENT DOCUMENTS

| 3,026,929 | A | * | 3/1962 | Burns | B64D 37/16 417/203 |
| 3,658,249 | A | * | 4/1972 | Sharpe | F02C 7/224 239/125 |
| 5,241,814 | A | | 9/1993 | Butler | |
| 5,317,877 | A | * | 6/1994 | Stuart | F02C 7/185 60/736 |
| 6,810,674 | B2 | | 11/2004 | Clements | |
| 7,770,388 | B2 | | 8/2010 | Desai | |
| 8,572,974 | B2 | | 11/2013 | Veilleux | |
| 11,674,455 | B2 | | 6/2023 | Rutar | |
| 2003/0074884 | A1 | * | 4/2003 | Snow | F02C 9/48 60/764 |
| 2005/0022498 | A1 | * | 2/2005 | Futa, Jr. | F02C 7/232 60/39.281 |
| 2010/0307157 | A1 | * | 12/2010 | Bilton | F02C 7/224 60/730 |
| 2011/0296846 | A1 | * | 12/2011 | Aurousseau | F02C 7/275 60/787 |
| 2013/0318988 | A1 | | 12/2013 | Robinson | |
| 2015/0101339 | A1 | * | 4/2015 | Veilleux, Jr. | F02C 7/236 60/734 |
| 2018/0135529 | A1 | * | 5/2018 | Portolese | F02C 9/263 |

(Continued)

*Primary Examiner* — Thomas P Burke
(74) *Attorney, Agent, or Firm* — Kinney & Lange, P.A.

(57) ABSTRACT

A fuel system for a gas turbine engine includes a fuel control with an outlet for connection to a burner. The fuel system includes a first pump unit connected to a gear box. The first pump unit includes a first housing, a first drive shaft connected to the gearbox, and a main pump within the first housing and powered by the first drive shaft. A stability-shutoff valve is in the first housing and includes an inlet connected to an outlet of the main pump. A fuel-oil-cooler bypass valve is in the first housing and includes an inlet connected to an outlet of the stability-shutoff valve and an outlet connected to an inlet of the fuel control. The fuel system also includes a fuel oil cooler with a fuel inlet connected to the outlet of the stability-shutoff valve and a fuel outlet connected to the inlet of the fuel control.

12 Claims, 1 Drawing Sheet

(56) References Cited

U.S. PATENT DOCUMENTS

| | | | |
|---|---|---|---|
| 2020/0378315 A1* | 12/2020 | Reuter | F02C 9/263 |
| 2021/0079848 A1* | 3/2021 | Cocks | F02C 7/236 |
| 2021/0222625 A1* | 7/2021 | O'Rorke | F02C 7/236 |
| 2022/0381186 A1 | 12/2022 | Adique et al. | |
| 2023/0167771 A1 | 6/2023 | O'Rorke et al. | |
| 2023/0383736 A1 | 11/2023 | O'Rorke et al. | |

\* cited by examiner

COMPACT SINGLE VARIABLE DISPLACEMENT PUMP FUEL SYSTEM WITH HIGH PRESSURE FUEL OIL COOLER BYPASS AND GAS GENERATOR FAULT

BACKGROUND

The present disclosure relates to fuel systems in gas turbine engines and more particularly to thermal management of fuel systems.

In a gas turbine engine, oil is distributed to various components, such as bearings, for cooling and lubrication. The oil is heated as it circulates around or through these various components. The oil can be cooled, at least in part, by a fuel oil cooler that transfers heat from the oil to fuel in a fuel system of the gas turbine engine. To prevent the fuel in the fuel system from experiencing overtemperature, the gas turbine engine uses a thermal recirculation system to manage fuel temperatures. The thermal recirculation system recirculates the fuel in the fuel system through a fuel tank and/or other sections of the aircraft or gas turbine engine to prevent the fuel from experiencing overtemperature.

The thermal recirculation system includes a large amount of hardware and plumbing that is relatively heavy and takes up a lot of space on the aircraft. Elimination of the thermal recirculation system would save space and weight that the aircraft could use to carry more fuel. The thermal recirculation system has not been eliminated in the past because the fuel oil cooler has needed the thermal recirculation system for managing heat loads in the fuel oil cooler. While the thermal recirculation system has been satisfactory for managing thermal loads of the fuel oil cooler, a lighter alternative to the thermal recirculation system is desired.

SUMMARY

In one example, a fuel system for a gas turbine engine includes a fuel control with an outlet for fluidical connection to a burner of the gas turbine engine. The fuel system also includes a gearbox and a first pump unit connected to the gear box. The first pump unit includes a first housing, a first drive shaft mechanically connected to the gearbox, and a main pump within the first housing and powered by the first drive shaft. A stability-shutoff valve is in the first housing and includes an inlet fluidically connected to an outlet of the main pump and a modulating window for forming an adjustable flow restriction downstream from the main pump. A fuel-oil-cooler bypass valve is in the first housing and includes an inlet fluidically connected to an outlet of the stability-shutoff valve and an outlet fluidically connected to an inlet of the fuel control. The fuel system also includes a fuel oil cooler with a fuel inlet fluidically connected to the outlet of the stability-shutoff valve and a fuel outlet fluidically connected to the inlet of the fuel control.

In another example, a method is disclosed for controlling a fuel system for a gas turbine engine. The method includes directing fuel from an outlet of a main pump to an inlet of a fuel oil cooler. Fuel is directed from an outlet of the fuel oil cooler to a fuel control. The fuel control is in fluidic communication with a burner of the gas turbine engine. Fuel is directed from the outlet of the main pump to the fuel control through a fuel-oil-cooler bypass valve to adjust a temperature of an oil in the fuel oil cooler. An inlet of the fuel-oil-cooler bypass valve is fluidically connected to the outlet of the main pump upstream from the inlet of the fuel oil cooler. An outlet of the fuel-oil-cooler bypass valve is fluidically connected to the fuel control downstream from the outlet of the fuel oil cooler so as to form a bypass flow path around the fuel oil cooler.

In another example, a pump unit for a fuel system of a gas turbine engine includes a housing, a unit inlet, and a drive shaft extending into the housing. A main pump is in the housing and includes a rotor connected to the drive shaft and an inlet fluidically connected to the unit inlet. A stability-shutoff valve is in the housing and includes an inlet fluidically connected to an outlet of the main pump, a first solenoid, and a modulating window for forming an adjustable flow restriction downstream from the main pump. A shutoff valve is in the housing and includes a second solenoid and an inlet fluidically connected to the unit inlet. An augmentor pump is in the housing and includes a rotor connected to the drive shaft and an inlet fluidically connected to an outlet of the shutoff valve. A fuel-oil-cooler bypass valve is in the housing and includes an inlet fluidically connected to an outlet of the stability-shutoff valve.

DETAILED DESCRIPTION

Figure 1:
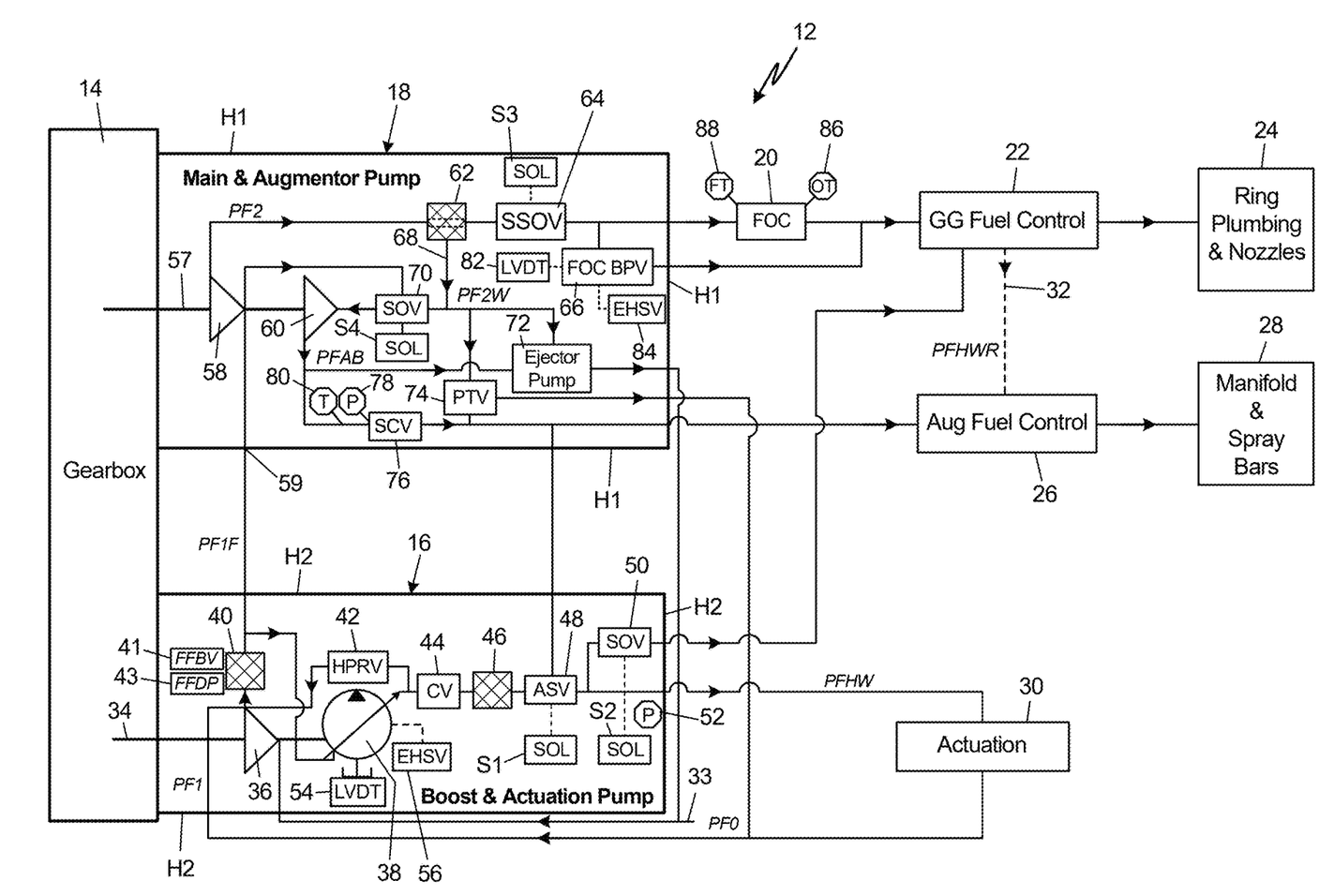
FIG. 1 is a schematic representation of a fuel system.

FIG. 1 is a schematic representation of fuel system 12 for a gas turbine engine onboard an aircraft. As shown in FIG. 1, fuel system 12 includes gearbox 14, boost-actuation pump unit 16, main-augmentor pump unit 18, fuel oil cooler (FOC) 20, gas generator (GG) fuel control 22, burners 24, augmentor fuel control 26, augmentor 28, actuation loop 30, regulated fuel control line 32, and system inlet 33. In the example of FIG. 1, boost-actuation pump unit 16 can include second housing H2, first drive shaft 34, boost pump 36, actuation pump 38, main filter 40, high pressure relief valve (HPRV) 42, check valve (CV) 44, actuation filter 46, actuation selector valve (ASV) 48, first solenoid S1, first shutoff valve (SOV) 50, second solenoid S2, and pressure sensor 52. As shown in FIG. 1, actuation pump 38 can be a variable displacement pump with linear variable differential transformer (LVDT) 54 and electrohydraulic servo valve (EHSV) 56. In the example of FIG. 1, main-augmentor pump unit 18 can include first housing H1, second drive shaft 57, main pump 58, unit inlet 59, augmentor pump 60, wash filter 62, stability-shutoff valve (SSOV) 64, third solenoid S3, fuel-oil-cooler (FOC) bypass valve 66, augmentor control lines 68, second shutoff valve (SOV) 70, fourth solenoid S4, ejector pump 72, pump transfer valve (PTV) 74, stabilizing check valve (SCV) 76, pressure sensor 78, and temperature sensor 80. FOC bypass valve 66 can include linear variable differential transformer (LVDT) 82 and electrohydraulic servo valve (EHSV) 84. FOC 20 can include oil temperature (OT) sensor 86 and fuel temperature (FT) sensor 88.

Boost-actuation pump unit 16 and main-augmentor pump unit 18 are separate units that are both mechanically connected to gearbox 14. As shown in FIG. 1, various fuel conduits fluidically connect boost-actuation pump unit 16 and main-augmentor pump unit 18 to the other components of fuel system 12. Gearbox 14 can be an engine mounted gearbox on a gas turbine engine of an aircraft.

First drive shaft 34 of boost-actuation pump unit 16 is mechanically coupled to gearbox 14 such that first drive shaft 34 is rotationally driven by gearbox 14 to power boost-actuation pump unit 16. Second housing H2 of boost-actuation pump unit 16 can be mounted to gearbox 14 and physically supported by gearbox 14. Second housing H2 houses boost pump 36, actuation pump 38, main filter 40, high pressure relief valve (HPRV) 42, check valve (CV) 44, actuation filter 46, actuation selector valve (ASV) 48, first solenoid S1, first shutoff valve (SOV) 50, second solenoid S2, pressure sensor 52, and at least a portion of first drive shaft 34. Both boost pump 36 and actuation pump 38 are connected to first drive shaft 34 and powered by first drive shaft 34.

Boost pump 36 includes a centrifugal rotor or disc pack that is rotated directly by first drive shaft 34. An inlet of boost pump 36 is fluidically connected to system inlet 33. System inlet 33 is fluidically connected to a fuel source (not shown). The fuel source can include a fuel tank and fuel pumps that supply fuel to system inlet 33 at an initial pressure PF0. The initial pressure PF0 can be at a pressure sufficient to move the fuel from the fuel tank, through a wing of the aircraft, and to the inlet of boost pump 36. For example, the initial pressure PF0 can be about 50 psi (3.4 atm). An outlet of boost pump 36 is fluidically connected to an inlet of main filter 40 and to actuation loop 30. Actuation loop 30 hydraulically powers an actuation system (not shown) of the gas turbine engine and/or the aircraft. Boost pump 36 pressurizes the fuel entering boost pump 36 such that the fuel exiting the outlet of boost pump 36 to main filter 40 and actuation loop 30 is at an interstage pressure PF1 that is greater than the initial pressure PF0. For example, the interstage pressure PF1 of the fuel exiting boost pump 36 can be at about 150 psi (10.2 atm) to about 300 psi (20.4 atm).

The inlet of main filter 40 is fluidically connected to the outlet of boost pump 36 and receives fuel from boost pump 36 at the interstage pressure PF1. An outlet of main filter 40 is fluidically connected to an inlet of actuation pump 38. The outlet of main filter 40 is also fluidically connected to an inlet of main pump 58 and to an inlet of second SOV 70 through unit inlet 59 of main-augmentor pump unit 18. Thus, the outlet of main filter 40 supplies fuel to actuation pump 38, to main pump 58, and to second SOV 70. The fuel exiting main filter 40 is at a filtered interstage pressure PF1F that is slightly lower than the interstage pressure PF1 for having passed through main filter 40. Main filter 40 can include a fuel filter bypass valve 41 and a fuel filter delta pressure sensor 43. Fuel filter bypass valve 41 provides a bypass flow path through main filter 40 should screens of main filter 40 become too clogged. Providing a bypass flow path through main filter 40 ensures that actuation pump 38 and main pump 58 are never fuel starved by main filter 40. Fuel filter delta pressure sensor 43 measures the pressure of the fuel in main filter 40 and communicates the pressure to an electronic engine control of the aircraft, such as a FADEC. The pressure readings from fuel filter delta pressure sensor 43 can be used to determine when the screens of main filter 40 need to be changed.

The inlet of actuation pump 38 is fluidically connected to the outlet of main filter 40 and receives fuel from main filter 40 at the filtered interstage pressure PF1F. The filtered interstage pressure PF1F can be about 150 psi (10.2 atm) to about 300 psi (20.4 atm). As shown in FIG. 1, actuation pump 38 can be a variable displacement pump with linear variable differential transformer (LVDT) 54 and electrohydraulic servo valve (EHSV) 56. The FADEC of the aircraft can be in electrical communication with LVDT 54 and EHSV 56 to control displacement of actuation pump 38. Actuation pump 38 increases the pressure of the fuel entering the inlet of actuation pump 38 to a pressure in excess of 2000 psi (136 atm). In some examples, the fuel exiting the outlet of actuation pump 38 can be in excess of 3000 psi (204 atm). The outlet of actuation pump 38 is fluidically connected to an inlet of check valve 44 and an inlet of high pressure relief valve (HPRV) 42.

The inlet of HPRV 42 is fluidically connected to the outlet of actuation pump 38. HPRV 42 by default is in a closed state. An outlet of HPRV 42 is fluidically connected to the inlet of main filter 40. When the fuel downstream from the outlet of actuation pump 38 climbs to a pressure that exceeds an operating parameter of fuel system 12, the HPRV 42 can open up to allow fuel to flow from the outlet of actuation pump 38 to the inlet of main filter 40, thereby relieving pressure at the outlet of actuation pump 38. In this way HPRV 42 protects fuel system 12 from over pressurization that could damage actuation pump 38 and other components of fuel system 12.

The inlet of check valve 44 is fluidically connected to the outlet of actuation pump 38. An outlet of check valve 44 is fluidically connected to an inlet of actuation filter 46. Check valve 44 prevents fuel from back flowing toward the outlet of actuation pump 38. Actuation filter 46 washes and filters the fuel exiting actuation pump 38 and check valve 44. The fuel exiting actuation filter 46 is at a washed pressure PFHW that is slightly less than the pressure of the fuel exiting actuation pump 38. Thus, in some examples, the washed pressure PFHW is in excess of 2000 psi (136 atm). In other examples, the washed pressure PFHW can be in excess of 3000 psi (204 atm). An outlet of actuation filter 46 is fluidically connected to a first inlet of actuation selector valve (ASV) 48. Thus, actuation filter 46 directs fuel at the washed pressure PFHW to ASV 48.

ASV 48 includes a first inlet, a second inlet, and an outlet. The first inlet of ASV 48 is fluidically connected to the outlet of actuation filter 46 as discussed above. The second inlet of ASV 48 is fluidically connected to an outlet of stabilizing check valve (SCV) 76, which is discussed below in greater detail. The outlet of ASV 48 is fluidically connected to an inlet of first shutoff valve (SOV) 50 and to actuation loop 30. First solenoid S1 controls ASV 48. The FADEC (not shown) of the aircraft can be in electronic communication with first solenoid S1 to control ASV 48 and selectively open and close the first inlet of ASV 48 and the second inlet of ASV 48. While actuation pump 38 is functional, the second inlet of ASV 48 is closed and the first inlet of ASV 48 is open such that actuation pump 38 supplies fuel to actuation loop 30 through check valve 48, through actuation filter 46, and through ASV 48. Pressure sensor 52 can be in communication with the FADEC to measure a pressure of the fuel flow to actuation loop 30 from actuation pump 38. Based on the pressure measurements of from pressure sensor 52, the FADEC can set the displacement of actuation pump 38 to meet the pressure demands of actuation loop 30.

Should actuation pump 38 fail, the FADEC of the aircraft can command ASV 48 to open the second inlet of ASV 48. With the second inlet of ASV 48 open, fuel can be supplied to actuation loop 30 from augmentor pump 60. While fuel is supplied to actuation loop 30 from augmentor pump 60, check valve 44 prevents fuel from back flowing into actuation pump 38. First solenoid S1 can also close first inlet of ASV 48 to prevent fuel from back flowing into actuation pump 38.

The inlet of first shutoff valve (SOV) 50 is fluidically connected to the outlet of ASV 48. The outlet of first SOV 50 is fluidically connected to a first inlet of gas generator (GG) fuel control 22. Second solenoid S2 controls first SOV 50. The FADEC (not shown) of the aircraft can be in electronic communication with second solenoid S2 to control first SOV 50 and selectively open and close first SOV 50. GG fuel control 22 is a fuel control that receives fuel flow from actuation pump 38 and/or main pump 58 and regulates fuel flow to the ring plumbing and nozzles of burners 24. GG fuel control 22 includes a first inlet and a second inlet. The first inlet of GG fuel control 22 is fluidically connected to the outlet of first SOV 50. The second inlet of GG fuel control 22 is fluidically connected to an outlet of fuel oil cooler 20 and receives fuel flow from main pump 58. While actuation pump 38 is functional, first SOV 50 is open such that actuation pump 38 supplies fuel to the first inlet of GG fuel control 22. As discussed above, should actuation pump 38 fail, the FADEC can command ASV 48 to open the second inlet of ASV 48 to supply fuel from augmentor pump 60 to actuation loop 30. In this scenario, the FADEC also commands second solenoid S2 to close first SOV 50 to prevent fuel flow from augmentor pump 60 going to GG fuel control 22. As discussed further below, GG fuel control 22 receives fuel from main pump 58 and actuation pump 38 to supply fuel to burners 24. First SOV 50 prevents augmentor pump 60 from supplying fuel flow to GG fuel control 22 because the outlet pressure of augmentor pump 60 is too similar to the outlet pressure of main pump 58. Supplying two fuel flows to GG fuel control 22 with similar pressures can result in a force fight in GG fuel control 22 that can impact performance of GG fuel control 22. In the event that GG fuel control 22 malfunctions, the FADEC can command second solenoid S2 to close first SOV 50 to stop fuel flow from actuation pump 38 to burners 24.

Second drive shaft 57 of main-augmentor pump unit 18 is mechanically coupled to gearbox 14 such that second drive shaft 57 is rotationally driven by gearbox 14 to power main-augmentor pump unit 18. First housing H1 of main-augmentor pump unit 18 can be mounted to gearbox 14 and physically supported by gearbox 14. First housing H1 houses main pump 58, augmentor pump 60, wash filter 62, stability-shutoff valve (SSOV) 64, third solenoid S3, fuel-oil-cooler (FOC) bypass valve 66, augmentor control lines 68, second shutoff valve (SOV) 70, fourth solenoid S4, ejector pump 72, pump transfer valve (PTV) 74, stabilizing check valve (SCV) 76, pressure sensor 78, temperature sensor 80, and at least a portion of second drive shaft 57. Both main pump 58 and augmentor pump 60 are connected to second drive shaft 57 and powered by second drive shaft 57.

Main pump 58 includes a centrifugal rotor or disc pack that is rotated directly by second drive shaft 57. During operation of the gas turbine engine and fuel system 12, second drive shaft 57 constantly actuates main pump 58. An inlet of main pump 58 is fluidically connected to the outlet of main filter 40. Since the inlet of main pump 58 is fluidically connected to the outlet of main filter 40, main pump 58 receives fuel from boost pump 36 at the filtered interstage pressure PF1F. As noted above, the filtered interstage pressure PF1F can be about 150 psi (10.2 atm) to about 300 psi (20.4 atm). Main pump 57 increases the pressure of the fuel entering main pump 57 such that the fuel exiting main pump 57 is at a main pressure PF2. In some examples, the main pressure PF2 of the fuel exiting main pump 57 is in excess of 2000 psi (136 atm). In other examples, the main pressure PF2 can be in excess of 3000 psi (204 atm). An outlet of main pump 57 is fluidically connected to an inlet of wash filter 62.

Wash filter 62 includes a first outlet that is fluidically connected to the inlet of wash filter 62 by a washing flow passage. In the example of FIG. 1, there are no screens or filtering elements in the washing flow passage between the inlet and the first outlet of wash filter 62. Wash filter 62 also includes a second outlet. Screens of wash filter 62 are between the second outlet and the washing flow passage, such that the second outlet of wash filter 62 only receives fuel that has been filtered and washed by the screens of wash filter 62. The first outlet of wash filter 62 is a washing flow outlet that is fluidically connected to an inlet of stability-shutoff valve (SSOV) 64. The second outlet of wash filter 62 is a washed flow outlet that is fluidically connected to augmentor control lines 68.

As shown in FIG. 1, stability-shutoff valve (SSOV) 64 is located within first housing H1 of main-augmentor pump unit 18. An inlet of SSOV 64 is fluidically connected to the first outlet of wash filter 62. The outlet of SSOV 64 is fluidically connected to an inlet of fuel oil cooler (FOC) 20. The outlet of SSOV 64 is also fluidically connected to an inlet of fuel-oil-cooler (FOC) bypass valve 66. SSOV 64 is both a shutoff valve and a stabilizing valve. Third solenoid S3 actuates the shutoff valve function of SSOV 64 to open and close SSOV 64. The FADEC of the aircraft can be in electrical communication with third solenoid S3 to selectively open and close SSOV 64. The FADEC can also control third solenoid S3 to partially open and partially close SSOV 64 to form an adjustable flow restriction in the flow path between main pump 58 and GG fuel control 22. The distance between main-augmentor pump unit 18 and GG fuel control 22 can be substantial. Without SSOV 64, the distance between main-augmentor pump unit 18 and GG fuel control 22 can cause constructive interference in the fuel pressure between main pump 58 and GG fuel control 22. SSOV 64 includes a modulating window in the flow path between GG fuel control 22 and main pump 58 that forms a flow restriction that stabilizes fuel pressure on the pump side of SSOV 64, which prevents constructive interference in the flow path between main pump 58 and GG fuel control 22. At startup of the gas turbine engine, the FADEC of the aircraft commands third solenoid S3 to open SSOV 64. During operation of the gas turbine engine, the FADEC and third solenoid S3 keep SSOV 64 open and modulating the restriction in the flow path between main pump 58 and GG fuel control 22. In the event that GG fuel control 22 malfunctions, the FADEC commands third solenoid S3 to close SSOV 64 to shutoff fuel flow from main pump 58 to burners 24.

Fuel oil cooler (FOC) 20 is fluidically between SSOV 64 and GG fuel control 22. A fuel inlet of FOC 20 is fluidically connected to an outlet of SSOV 64. A fuel outlet of FOC 20 is fluidically connected to the second inlet of GG fuel control 22. FOC 20 can be a standard fuel oil cooler system that transfers heat between the fuel and oil of the gas turbine engine. Oil temperature sensor 86 can be a temperature sensor on the oil side of FOC 20 that communicates a temperature of the oil in FOC 20 to the FADEC of the aircraft. Fuel temperature sensor 88 can be a temperature sensor on the fuel side of FOC 20 that communicates a temperature of the fuel in FOC 20 to the FADEC. As discussed below, the FADEC can use the temperature readings from oil temperature sensor 86 and fuel temperature sensor 88 in the operation of FOC bypass valve 66 to selectively bypass FOC 20.

In the example of FIG. 1, FOC bypass valve 66 is located within first housing H1 of main-augmentor pump unit 18. An inlet of FOC bypass valve 66 is fluidically connected to the outlet of SSOV 64 upstream from the inlet of FOC 20. The outlet of FOC bypass valve 66 is fluidically connected by fuel conduit to the inlet of GG fuel control 22 downstream from the outlet of FOC 20. FOC bypass valve 66 includes linear variable differential transformer (LVDT) 82 and electrohydraulic servo valve (EHSV) 84 to control FOC bypass valve 66. The FADEC of the aircraft can be in electronic communication with EHSV 84 and LVDT 82 to control a position of FOC bypass valve 66. Through EHSV 84 and LVDT 82, the FADEC can command FOC bypass valve 66 to an open position, to a closed position, or to one of a plurality of positions between the open position and the closed position. Thus, FOC bypass valve 66 can be a variable valve that can be modulated to adjust a flow volume through FOC bypass valve 66. In other examples, FOC bypass valve 66 can be a solenoid valve that operates solely between an open state and a closed state.

During operation of the aircraft and the gas turbine engine, the FADEC can modulate FOC bypass valve 66 to control a temperature of the oil in FOC 20 and maintain the temperature and viscosity of the oil in a desired range. When the oil is too cool and viscous, more horsepower must be drawn from the gas turbine engine to circulate the oil through the oil system of the gas turbine engine, which decreases the efficiency of the gas turbine engine. When the oil is too hot, the oil can become too thin to properly lubricate and cool the bearings, gearboxes, and/or other components of gas turbine engine. Coking of the oil can also become an issue if the oil becomes too hot.

For example, if the FADEC determines through oil temperature sensor 86 that the oil in FOC 20 is dropping to a temperature where the oil will be more viscous than ideal for the gas turbine engine, the FADEC can command FOC bypass valve 66 to open. With FOC bypass valve 66 open, at least some of the fuel flow exiting SSOV 64 will pass through FOC bypass valve 66 and be directed straight to the second inlet of GG fuel control 22. The fuel flow passing through FOC bypass valve 66 to GG fuel control 22 bypasses FOC 20. The fuel flow bypassing FOC 20 decreases the amount of the fuel flow from main pump 58 to FOC 20. With decreased fuel flow to FOC 20, the rate of cooling of the oil in FOC 20 decreases, thereby preventing the oil in FOC 20 from overcooling and becoming too viscous.

When the FADEC determines through oil temperature sensor 86 that the oil in FOC 20 is rising to a temperature that is hotter than the ideal oil temperature for the gas turbine engine, the FADEC can command FOC bypass valve 66 to restrict or closes. With FOC bypass valve 66 restricted or closed, the amount of fuel flow from main pump 58 passing through FOC bypass valve 66 decreases. As the amount of fuel flow passing through FOC bypass valve 66 decreases, the amount of fuel passing through FOC 20 increases. The increased flow of fuel through FOC 20 increases the rate of cooling of the oil in FOC 20, thereby preventing the oil in FOC 20 from over temping.

The temperature of the fuel exiting FOC 20 and the temperature of the fuel entering GG fuel control 22 can also be controlled by FOC bypass valve 66. When the fuel is too cool, diffusive combustion of the fuel in the combustor of the gas turbine engine can decrease, which decreases the fuel efficiency of the gas turbine engine. If the fuel is too hot, coking of the fuel can occur within the ring plumbing and nozzles of burners 24. Thus, when the FADEC of the aircraft determines through fuel temperature sensor 88 that the temperature of the fuel exiting FOC 20 is too hot, the FADEC can command FOC bypass valve 66 to open (or further open if FOC bypass valve 66 is already partially open). Opening FOC bypass valve 66 causes fuel flow from main pump 58 and SSOV 64 to bypass FOC 20, thereby reducing the amount of heat that the fuel flow absorbs from the oil in FOC 20. If the temperature of the fuel flow entering GG fuel control 22 is too cold, the FADEC can command FOC bypass valve 66 to close or restrict, thereby increasing the amount of fuel flow through FOC 20. Decreasing the amount of fuel flow bypassing FOC 20 will increase the amount of fuel flow entering FOC 20. Increasing the fuel flow through FOC 20 will increase the amount of heat absorbed by the fuel flow from the oil in FOC 20, thereby raising the temperature of the fuel.

As discussed above, an inlet of second shutoff valve (SOV) 70 is fluidically connected to an outlet of main filter 40. An outlet of second SOV 70 is fluidically connected to an inlet of augmentor pump 60. Fourth solenoid S4 controls second SOV 70 to open and close second SOV 70. The FADEC can be in communication with fourth solenoid S4 to control actuation of fourth solenoid S4 and second SOV 70. Since the inlet of second SOV 70 is fluidically connected to the outlet of main filter 40, second SOV 70 receives fuel from boost pump 36 at the filtered interstage pressure PF1F. As noted above, the filtered interstage pressure PF1F can be about 150 psi (10.2 atm) to about 300 psi (20.4 atm).

An inlet of augmentor pump 60 is fluidically connected to the outlet of second SOV 70. Augmentor pump 60 includes a centrifugal rotor or disc pack rotor that is rotated directly by second drive shaft 57. During operation of the gas turbine engine and fuel system 12, second drive shaft 57 constantly actuates augmentor pump 60. Augmentor pump 60 increases the pressure of the fuel entering augmentor pump 60 from second SOV 70 such that the fuel exiting augmentor pump 60 is at an augmentor-boosted pressure PFAB. In some examples, the augmentor-boosted pressure PFAB of the fuel exiting augmentor pump 60 is in excess of 2000 psi (136 atm). In other examples, the augmentor-boosted pressure PFAB can be in excess of 3000 psi (204 atm). An outlet of augmentor pump 60 is fluidically connected to an inlet of stabilizing check valve (SCV) 76 and to an inlet of ejector pump 72. Second SOV 70 controls fuel flow to augmentor pump 60. When second SOV 70 is closed, the pump cavity of augmentor pump 60 is evacuated, such that the rotor of augmentor pump 60 is spinning in a vacuum. While the rotor of augmentor pump 60 is spinning in a vacuum, the horsepower draw of augmentor pump 60 is very low. Thus, while the rotor of augmentor pump 60 is always spinning during the operation of fuel system 12, second SOV 70 hydraulically turns off augmentor pump 60 while second SOV 70 is closed, and hydraulically activates augmentor pump 60 when second SOV 70 is open.

The inlet of ejector pump 72 is fluidically connected to the outlet of augmentor pump 60. An outlet of ejector pump 72 is fluidically connected to the inlet of boost pump 36. Ejector pump 72 can also include a second inlet that is fluidically connected to augmentor control lines 68. Augmentor control lines 68 receive washed fuel from wash filter 62 at a pressure PF2W that is slightly below that of main pressure PF2. In some examples, the pressure PF2W of the fuel in augmentor control lines 68 is in excess of 2000 psi (136 atm). In other examples, the pressure PF2W can be in excess of 3000 psi (204 atm). The inlet of boost pump 36 is generally at the same pressure as system inlet 33. As noted above, system inlet 33 is at initial pressure PF0, which can be about 50 psi (3.4 atm). Ejector pump 72 uses the pressure differential between the pressure PF2W and the initial pressure PF0 to evacuate the pump cavity of augmentor pump 60 when second SOV 70 is closed. The fuel evacuated from the pump cavity of augmentor pump 60 by ejector pump 72 is directed to the inlet of boost pump 36. Augmentor pump 60 supplies fuel flow to augmentor fuel control 26. Augmentor fuel control 26 is a fuel control that receives fuel flow from augmentor pump 60 and regulates fuel flow to a manifold and spray bars of augmentor 28 of the aircraft. Regulated fuel control line 32 is a control line that can be shared by GG fuel control 22 and augmentor fuel control 26. A regulator within GG fuel control 22 can take fuel received by GG fuel control 22 through the first inlet or the second inlet of GG fuel control 22 and set that fuel to a fixed pressure PFHWR. The fuel at the fixed pressure PFHWR is used for control of valves within GG fuel control 22. GG fuel control 22 can also direct fuel into regulated fuel control line 32 at the fixed pressure PFHWR to share with augmentor fuel control 26. Augmentor fuel control 26 also uses the fuel at the fixed pressure PFHWR for control of valves within augmentor fuel control 26. In this manner, augmentor fuel control 26 can rely on the regulator within GG fuel control 22 for a supply of fuel at the fixed pressure PFHWR and does not require its own regulator.

The inlet of stabilizing check valve (SCV) 76 is fluidically connected to the outlet of augmentor pump 60. An outlet of SCV 76 is fluidically connected to an inlet of augmentor fuel control 26. SCV 76 is a passive valve that functions as a check valve that prevents back flow into the outlet of augmentor pump 60. SCV 76 also passively functions as a stabilizer valve with a window that moves to modulate a flow restriction between augmentor pump 60 and augmentor fuel control 26. Augmentor fuel control 26 can be spaced a significant distance from main-augmentor pump unit 18. The restriction created by SCV 76 in the fuel line between the outlet of augmentor pump 60 and augmentor fuel control 26 minimizes pressure disturbances and constructive feedback from occurring in the fuel flow from augmentor pump 60 to augmentor fuel control 26.

Pump transfer valve (PTV) 74 includes a first mode that fluidically connects the outlet of SCV 76 to a leakage path. The leakage path fluidically connects PTV 74 to a fuel line connecting the outlet of boost pump 36 to actuation loop 30. PTV 74 is in the first mode when second SOV 70 is open and augmentor pump 60 is directing fuel through SCV 76 to augmentor fuel control 26. The FADEC of the aircraft can open second SOV 70 and actuate PTV 74 to the first mode when augmentor fuel control 26 needs to send fuel to augmentor 28. While augmentor pump 60 is pressurizing fuel and directing that fuel toward augmentor fuel control 26, a portion of the fuel outputted by augmentor pump 60 can passes through PTV 74 to the leakage path fluidically connected to the outlet of boost pump 36 to actuation loop 30. The fuel flow through PTV 74 to the leakage path is beneficial while augmentor fuel control 26 is powering up or when augmentor pump 60 is spooling down at shutdown of fuel system 12. PTV 74 and the leakage flowpath prevent augmentor pump 60 from overheating or the line between SCV 76 and augmentor fuel control 26 from over pressurizing.

PTV 74 includes a second mode that fluidically connects augmentor control line 68 with the inlet of augmentor fuel control 26. PTV 74 is in the second mode when second SOV 70 is closed and augmentor pump 60 is hydraulically off (i.e., the rotor of augmentor pump 60 is dry and spinning in a vacuum). The FADEC of the aircraft can close second SOV 70 and move PTV 74 to the second mode when augmentor fuel control 26 and augmentor 28 are in a period of rest and do not require fuel from augmentor pump 60. When augmentor pump 60 is hydraulically off and PTV 74 is in the second mode, fuel flows from augmentor control line 68 to the inlet of augmentor fuel control 26 to prime the fuel line between SCV 76 and augmentor fuel control 26. As described above, ejector pump 72 evacuates the fuel from augmentor pump 60 while second SOV 70 is closed. Priming the fuel line between SCV 76 and augmentor fuel control 26 allows augmentor fuel control 26 to activate faster once second SOV 70 is reopened, PTV 74 is moved to the first mode, and augmentor pump 60 resumes supplying fuel to augmentor fuel control 26.

As noted above, a second inlet of actuation selector valve (ASV) 48 of boost-actuation pump unit 16 is fluidically connected to the outlet of SCV 76. The FADEC of the aircraft can actuate ASV 48 to open the second inlet of ASV 48 to the outlet of ASV 48 to fluidically connect augmentor pump 60 to actuation loop 30 in the event that actuation pump 38 fails. The FADEC can also close first SOV 50 at the same time ASV 48 fluidically connects augmentor pump 60 to actuation loop 30 to prevent fuel flow from augmentor pump 60 being directed to GG fuel control 22. As noted above, the outlet pressure of augmentor pump 60 is too similar to the outlet pressure of main pump 58. Supplying two fuel flows to GG fuel control 22 with similar pressures can result in a force fight in GG fuel control 22 that can impact performance of GG fuel control 22.

During operation of fuel system 12, boost-actuation pump unit 16 and main-augmentor pump unit 18 support each other to supply fuel flow to GG fuel control 22 and actuation loop 30. During startup of the gas turbine engine, or when the gas turbine engine is operating at an intermediate condition, main pump 58 cannot generate the pressure rise for fuel to be delivered to the nozzles of burners 24 and have GG fuel control 22 operate as desired. Designing main pump 58 to satisfy start conditions would require a pump that would be grossly oversized at idle and above conditions. During this startup period or intermediate condition, actuation pump 38 can supply fuel to GG fuel control 22 through ASV 48 and through first SOV 50. As a variable displacement pump, actuation pump 38 is capable of simultaneously supplying high pressure fuel to both GG fuel control 22 and actuation loop 30. Once main pump 58 is powered up and supplying high pressure fuel to GG fuel control 22, GG fuel control 22 can select fuel from main pump 58. In the event that actuation pump 38 fails or malfunctions, first SOV 50 closes and ASV 48 can actuate to fluidically connect augmentor pump 60 to actuation loop 30. While GG fuel control 22 generally controls fuel flow to burners 24 and serves as a primary means for shutting off fuel flow to burners 24, SSOV 64 and first SOV 50 can together provide a secondary means for shutting off fuel flow to burners 24. In the event that GG fuel control 22 malfunctions, the FADEC can command SSOV 64 and first SOV 50 to both close, effectively cutting off fuel flow to burners 24. Providing a secondary means for shutting off fuel flow to burners 24 reduces the likelihood of a runaway gas turbine engine. In addition to the benefits listed above, FOC bypass valve 66 also allows fuel system 12 to control the temperature and viscosity of the oil in FOC 20 and to control the temperature of the fuel supplied to GG fuel control from main pump 58. FOC bypass valve 66 eliminates the need for a traditional thermal recirculation system to manage the thermal loads of FOC 20. Without a traditional thermal recirculation system, fuel system 12 is lighter and more compact than traditional fuel systems. The space and weight savings afforded by fuel system 12 allows the aircraft to carry more fuel or cargo.

Discussion of Possible Embodiments

The following are non-exclusive descriptions of possible embodiments of the present invention.

A fuel system for a gas turbine engine includes a fuel control with an outlet for fluidical connection to a burner of the gas turbine engine. The fuel system also includes a gearbox and a first pump unit connected to the gear box. The first pump unit includes a first housing, a first drive shaft mechanically connected to the gearbox, and a main pump within the first housing and connected to the first drive shaft and powered by the first drive shaft. A stability-shutoff valve is in the first housing and includes an inlet fluidically connected to an outlet of the main pump and a modulating window for forming an adjustable flow restriction downstream from the main pump. A fuel-oil-cooler bypass valve is in the first housing and includes an inlet fluidically connected to an outlet of the stability-shutoff valve and an outlet fluidically connected to an inlet of the fuel control. The fuel system also includes a fuel oil cooler with a fuel inlet fluidically connected to the outlet of the stability-shutoff valve and a fuel outlet fluidically connected to the inlet of the fuel control.

The fuel system of the preceding paragraph can optionally include, additionally and/or alternatively, any one or more of the following features, configurations and/or additional components in the paragraphs below.

In an embodiment of the foregoing fuel system, the fuel-oil-cooler bypass valve comprises an electrohydraulic servo valve and a linear variable differential transformer configured to move the fuel-oil-cooler bypass valve to an open position, to a closed position, or to one of a plurality of positions between the open position and the closed position.

In an embodiment of the foregoing fuel system, the fuel system further comprises: a system inlet for fluidic connection to a fuel tank and/or a tank pump; an actuation loop; a second pump unit connected to the gearbox and comprising: a second housing; a second drive shaft mechanically connected to the gearbox; a boost pump within the second housing and connected to the second drive shaft and powered by the second drive shaft, wherein the boost pump comprises: an inlet fluidically connected to the system inlet; and an outlet fluidically connected to an inlet of the main pump in the first housing; an actuation pump within the second housing and connected to the second drive shaft and powered by the second drive shaft, wherein the actuation pump is a variable displacement pump that comprises: an inlet fluidically connected to the outlet of the boost pump; and an outlet fluidically connected to the actuation loop; a first shutoff valve in the second housing comprising: an inlet fluidically connected to the outlet of the actuation pump; and an outlet fluidically connected to the fuel control.

In an embodiment of the foregoing fuel system, the fuel system further comprises: an augmentor fuel control comprising an outlet for fluidic connection to an augmentor of the gas turbine engine; and the first pump unit further comprises: a second shutoff valve comprising an inlet fluidically connected to the outlet of the boost pump; an augmentor pump within the first housing and connected to the first drive shaft and powered by the first drive shaft, wherein the augmentor pump comprises: an inlet fluidically connected to an outlet of the second shutoff valve; and an outlet fluidically connected to an inlet of the augmentor fuel control.

In an embodiment of the foregoing fuel system, the second pump unit further comprises: an actuation selector valve comprising: an outlet fluidically connected to the actuation loop; a first inlet fluidically connected to the outlet of the actuation pump; and a second inlet fluidically connected to the outlet of the augmentor pump.

In an embodiment of the foregoing fuel system, the actuation selector valve comprises a first solenoid, the first shutoff valve comprises a second solenoid, the stability-shutoff valve comprises a third solenoid, and the second shutoff valve comprises a fourth solenoid.

In an embodiment of the foregoing fuel system, the second pump unit further comprises: a main filter in the second housing and comprising: an inlet fluidically connected to the outlet of the boost pump, and an outlet fluidically connected to the inlet of the main pump and to the inlet of the actuation pump; a high pressure relief valve in the second housing and comprising: an inlet fluidically connected to the outlet of the actuation pump; and an outlet fluidically connected to the inlet of the main filter; a check valve in the second housing and comprising: an inlet fluidically connected to the outlet of the actuation pump; and an actuation filter in the second housing and comprising: an inlet fluidically connected to an outlet of the check valve; and an outlet fluidically connected to the first inlet of the actuation selector valve, wherein the check valve and the actuation filter fluidically connect the outlet of the actuation pump to the first inlet of the actuation selector valve.

In an embodiment of the foregoing fuel system, the first pump unit further comprises: a wash filter fluidically connecting the outlet of the main pump to the inlet of the stabilizer-shutoff valve, wherein the wash filter comprises an inlet fluidically connected to the outlet of the main pump, a washing flow outlet fluidically connected to the inlet of the stabilizer-shutoff valve, and a washed flow outlet; a stabilizing check valve fluidically between the augmentor pump and the augmentor fuel control, wherein the stabilizer check valve comprises: an inlet fluidically connected to the outlet of the augmentor pump; an outlet fluidically connected to the inlet of the augmentor fuel control; and a modulating window for forming an adjustable flow restriction downstream from the augmentor pump; and a pump transfer valve comprising: a first mode that fluidically connects the outlet of the stabilizing check valve to a leakage path, wherein the leakage path is fluidically connected between the outlet of the boost pump and the actuation loop; a second mode that fluidically connects the washed flow outlet of the wash filter with the inlet of the augmentor fuel control.

In an embodiment of the foregoing fuel system, the first pump unit further comprises: an ejector pump comprising: an inlet fluidically connected to the outlet of the augmentor pump upstream from the inlet of the stabilizing check valve; and an outlet fluidically connected to the inlet of the boost pump.

In an embodiment of the foregoing fuel system, the ejector pump comprises a second inlet that is fluidically connected to the washed flow outlet of the wash filter.

In another example, a method is disclosed for controlling a fuel system for a gas turbine engine. The method includes directing fuel from an outlet of a main pump to an inlet of a fuel oil cooler. Fuel is directed from an outlet of the fuel oil cooler to a fuel control. The fuel control is in fluidic communication with a burner of the gas turbine engine. Fuel is directed from the outlet of the main pump to the fuel control through a fuel-oil-cooler bypass valve to adjust a temperature of an oil in the fuel oil cooler. An inlet of the fuel-oil-cooler bypass valve is fluidically connected to the outlet of the main pump upstream from the inlet of the fuel oil cooler. An outlet of the fuel-oil-cooler bypass valve is fluidically connected to the fuel control downstream from the outlet of the fuel oil cooler so as to form a bypass flow path around the fuel oil cooler.

The method of the preceding paragraph can optionally include, additionally and/or alternatively, any one or more of the following features, configurations and/or additional components in the paragraphs below.

In an embodiment of the foregoing method, the method further comprises stopping fuel flow to the fuel oil cooler and the fuel control when the fuel control malfunctions by closing a stabilizer-shutoff valve, wherein the stabilizer-shutoff valve is fluidically between the main pump and the fuel oil cooler, and fluidically between the main pump and the fuel-oil-cooler bypass valve.

In an embodiment of the foregoing method, the method further comprises: directing fuel from an outlet of an actuator pump to an actuation loop; directing fuel from the outlet of the actuator pump to the fuel control; and stopping fuel flow to the fuel control when the fuel control malfunctions by closing a first shutoff valve, wherein the first shutoff valve is fluidically between the actuation pump and the fuel control.

In an embodiment of the foregoing method, the method further comprises: powering the actuation pump by a first drive shaft connected to a gearbox; and powering the main pump by a second drive shaft connected to the gearbox.

In an embodiment of the foregoing method, the method further comprises: directing fuel from an outlet of an augmentor pump to an augmentor fuel control, wherein the augmentor fuel control is in fluidic communication with a manifold and spray bars of an augmentor; and directing fuel from the outlet of the augmentor pump to the actuation loop via an actuation selector valve when the actuation pump malfunctions.

In an embodiment of the foregoing method, the method further comprises powering the augmentor pump by the second drive shaft connected to the gearbox.

In an embodiment of the foregoing method, the method further comprises: directing fuel from an outlet of a boost pump to an inlet of the main pump; directing fuel from the outlet of the boost pump to an inlet of the actuation pump; directing fuel from the outlet of the boost pump to an inlet of a second shutoff valve, wherein an outlet of the second shutoff valve is fluidically connected to an inlet of the augmentor pump; and powering the boost pump by the first drive shaft connected to the gearbox.

In an embodiment of the foregoing method, the method further comprises: constantly spinning a rotor of the augmentor pump by the second drive shaft and the gearbox while the fuel system is in operation; hydraulically shutting off the augmentor pump by closing the second shutoff valve while the augmentor and augmentor fuel control are inactive; hydraulically activating the augmentor pump by opening the second shutoff valve when the augmentor is needed by the gas turbine engine; and hydraulically activating the augmentor pump by opening the second shutoff valve when the actuation pump malfunctions to direct fuel to the actuation loop.

In an embodiment of the foregoing method, the method further comprises evacuating a pump cavity of the augmentor pump by an ejector pump when the second shutoff valve is closed.

In another example, a pump unit for a fuel system of a gas turbine engine includes a housing, a unit inlet, and a drive shaft extending into the housing. A main pump is in the housing and includes a rotor connected to the drive shaft and an inlet fluidically connected to the unit inlet. A stability-shutoff valve is in the housing and includes an inlet fluidically connected to an outlet of the main pump, a first solenoid, and a modulating window for forming an adjustable flow restriction downstream from the main pump. A shutoff valve is in the housing and includes a second solenoid and an inlet fluidically connected to the unit inlet. An augmentor pump is in the housing and includes a rotor connected to the drive shaft and an inlet fluidically connected to an outlet of the shutoff valve. A fuel-oil-cooler bypass valve is in the housing and includes an inlet fluidically connected to an outlet of the stability-shutoff valve.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel system for a gas turbine engine comprising:
   a fuel control comprising a fuel control outlet for fluidical connection to burner nozzles of the gas turbine engine;
   a gearbox;
   a first pump unit connected to the gearbox and comprising:
      a first housing;
      a first drive shaft mechanically connected to the gearbox;
      a main pump within the first housing and powered by the first drive shaft;
      a stability-shutoff valve in the first housing and comprising:
         a stability-shutoff inlet fluidically connected to a main pump outlet; and
         a modulating window for forming an adjustable flow restriction downstream from the main pump;
      a fuel-oil-cooler bypass valve in the first housing and comprising:
         a fuel-oil-cooler bypass valve inlet fluidically connected to a stability-shutoff valve outlet of the stability-shutoff valve; and
         a fuel-oil-cooler bypass valve outlet fluidically connected to a fuel control inlet;
   a fuel oil cooler comprising:
      a fuel inlet fluidically connected to the stability-shutoff valve outlet; and
      a fuel outlet fluidically connected to the fuel control inlet;
   a system inlet for fluidic connection to a fuel tank and/or a tank pump;
   an actuation loop;
   a second pump unit connected to the gearbox and comprising:
      a second housing;
      a second drive shaft mechanically connected to the gearbox;
      a boost pump within the second housing and powered by the second drive shaft, wherein the boost pump comprises:
         a boost pump inlet fluidically connected to the system inlet; and
         a boost pump outlet fluidically connected to a main pump inlet in the first housing;
      an actuation pump within the second housing and powered by the second drive shaft, wherein the actuation pump is a variable displacement pump that comprises:

an actuation pump inlet fluidically connected to the boost pump outlet; and an actuation pump outlet fluidically connected to the actuation loop;

a main filter in the second housing and comprising:
a main filter inlet fluidically connected to the boost pump outlet, and
a main filter outlet fluidically connected to the main pump inlet and to the actuation pump inlet;

a high pressure relief valve in the second housing and comprising:
a high pressure relief valve inlet fluidically connected to the actuation pump outlet; and
a high pressure relief valve outlet fluidically connected to the main filter inlet; and ring plumbing, wherein the fuel control is upstream of the ring plumbing and fluidically connects the ring plumbing to the fuel outlet of the fuel oil cooler, and the fuel control fluidically connects the ring plumbing to the fuel-oil-cooler bypass valve outlet, and wherein the fuel control regulates and controls fuel flow to the ring plumbing.

2. The fuel system of claim 1, wherein the fuel-oil-cooler bypass valve comprises an electrohydraulic servo valve and a linear variable differential transformer configured to move the fuel-oil-cooler bypass valve to an open position, to a closed position, or to one of a plurality of positions between the open position and the closed position.

3. The fuel system of claim 2, further comprising:
a first shutoff valve in the second housing comprising:
a first shutoff valve inlet fluidically connected to the actuation pump outlet; and
a first shutoff valve outlet fluidically connected to the fuel control.

4. The fuel system of claim 3, further comprising:
an augmentor fuel control comprising an augmentor fuel control outlet for fluidic connection to an augmentor of the gas turbine engine; and
the first pump unit further comprises:
a second shutoff valve comprising a second shutoff valve inlet fluidically connected to the boost pump outlet;
an augmentor pump within the first housing and powered by the first drive shaft, wherein the augmentor pump comprises:
an augmentor pump inlet fluidically connected to a second shutoff valve outlet; and
an augmentor pump outlet fluidically connected to an augmentor fuel control inlet.

5. The fuel system of claim 4, wherein the second pump unit further comprises:
an actuation selector valve comprising:
an actuation selector valve outlet fluidically connected to the actuation loop;
an actuation selector valve first inlet fluidically connected to the actuation pump outlet; and
an actuation selector valve second inlet fluidically connected to the augmentor pump outlet.

6. The fuel system of claim 5, wherein the actuation selector valve comprises a first solenoid, the first shutoff valve comprises a second solenoid, the stability-shutoff valve comprises a third solenoid, and the second shutoff valve comprises a fourth solenoid.

7. The fuel system of claim 6, wherein the second pump unit further comprises:
a check valve in the second housing and comprising:
a check valve inlet fluidically connected to the actuation pump outlet; and
an actuation filter in the second housing and comprising:
an actuation filter inlet fluidically connected to a check valve outlet; and
an actuation filter outlet fluidically connected to the actuation selector valve first inlet,
wherein the check valve and the actuation filter fluidically connect the actuation pump outlet to the actuation selector valve first inlet.

8. The fuel system of claim 7, wherein the first pump unit further comprises:
a wash filter fluidically connecting the main pump outlet to the stabilizer-shutoff valve inlet, wherein the wash filter comprises:
a wash filter inlet fluidically connected to the main pump outlet,
a first outlet, wherein the first outlet is a washing flow outlet of the wash filter fluidically connected to the stabilizer-shutoff valve inlet, and
a second outlet, wherein the second outlet is a washed flow outlet of the wash filter;
a stabilizing check valve fluidically between the augmentor pump and the augmentor fuel control, wherein the stabilizer check valve comprises:
a stabilizer check valve inlet fluidically connected to the augmentor pump outlet;
a stabilizer check valve outlet fluidically connected to the augmentor fuel control inlet; and
a modulating window for forming an adjustable flow restriction downstream from the augmentor pump; and
a pump transfer valve comprising:
a first mode that fluidically connects the stabilizing check valve outlet to a leakage path, wherein the leakage path is fluidically connected between the boost pump outlet and the actuation loop;
a second mode that fluidically connects the washed flow outlet of the wash filter with the augmentor fuel control inlet.

9. The fuel system of claim 8, wherein the first pump unit further comprises:
an ejector pump comprising:
an ejector pump inlet fluidically connected to the augmentor pump outlet upstream from the stabilizing check valve inlet; and
an ejector pump outlet fluidically connected to the boost pump inlet.

10. The fuel system of claim 9, wherein the ejector pump comprises a second inlet that is fluidically connected to the washed flow outlet of the wash filter.

11. A fuel system for a gas turbine engine comprising:
ring plumbing;
a fuel control upstream of the ring plumbing and comprising a fuel control outlet fluidically connected to the ring plumbing;
a gearbox;
a first pump unit connected to the gearbox and comprising:
a first housing;
a first drive shaft mechanically connected to the gearbox;
a main pump within the first housing and powered by the first drive shaft;
a stability-shutoff valve in the first housing and comprising:
a stability-shutoff inlet fluidically connected to a main pump outlet; and a modulating window for forming an adjustable flow restriction downstream from the main pump;
a system inlet for fluidic connection to a fuel tank and/or a tank pump;
an actuation loop;
a second pump unit connected to the gearbox and comprising:
   a second housing;
   a second drive shaft mechanically connected to the gearbox;
   a boost pump within the second housing and powered by the second drive shaft, wherein the boost pump comprises:
      a boost pump inlet fluidically connected to the system inlet; and
      a boost pump outlet fluidically connected to a main pump inlet in the first housing;
   an actuation pump within the second housing and powered by the second drive shaft, wherein the actuation pump is a variable displacement pump that comprises:
      an actuation pump inlet fluidically connected to the boost pump outlet; and
      an actuation pump outlet fluidically connected to the actuation loop;
   a main filter in the second housing and comprising:
      a main filter inlet fluidically connected to the boost pump outlet, and
      a main filter outlet fluidically connected to the main pump inlet and to the actuation pump inlet;
   a high pressure relief valve in the second housing and comprising:
      a high pressure relief valve inlet fluidically connected to the actuation pump outlet; and
      a high pressure relief valve outlet fluidically connected to the main filter inlet;
a fuel oil cooler comprising:
   a fuel inlet fluidically connected to a stability-shutoff valve outlet; and
   a fuel outlet fluidically connected to a fuel control inlet; and
a fuel-oil-cooler bypass valve comprising:
   a fuel-oil-cooler bypass valve inlet fluidically connected to the stability-shutoff valve outlet; and
   a fuel-oil-cooler bypass valve outlet fluidically connected to the fuel control inlet.

12. The fuel system of claim 11, wherein the fuel-oil-cooler bypass valve comprises an electrohydraulic servo valve and a linear variable differential transformer configured to move the fuel-oil-cooler bypass valve to an open position, to a closed position, or to one of a plurality of positions between the open position and the closed position.

* * * * *